(12) United States Patent
Tanaka et al.

(10) Patent No.: US 7,880,790 B2
(45) Date of Patent: *Feb. 1, 2011

(54) IMAGE-SIGNAL PROCESSING APPARATUS FOR USE IN COMBINATION WITH AN IMAGE SENSOR

(75) Inventors: Kenji Tanaka, Tokyo (JP); Akira Hamano, Kanagawa (JP); Manabu Koiso, Chiba (JP)

(73) Assignee: Sony Corporation, Tokyo (JP)

( * ) Notice: Subject to any disclaimer, the term of this patent is extended or adjusted under 35 U.S.C. 154(b) by 465 days.

This patent is subject to a terminal disclaimer.

(21) Appl. No.: 11/975,815

(22) Filed: Oct. 22, 2007

(65) Prior Publication Data

US 2008/0068482 A1 Mar. 20, 2008

Related U.S. Application Data

(63) Continuation of application No. 10/258,331, filed as application No. PCT/JP02/01375 on Feb. 18, 2002, now Pat. No. 7,295,238.

(30) Foreign Application Priority Data

Feb. 23, 2001 (JP) .......................... P2001-049272

(51) Int. Cl.
*H04N 5/235* (2006.01)
*H04N 9/64* (2006.01)
*H04N 3/14* (2006.01)
*H04N 5/335* (2006.01)

(52) U.S. Cl. ........................ 348/316; 348/311; 348/323; 348/243; 348/229.1

(58) Field of Classification Search .............. 348/222.1, 348/229.1, 241, 243, 311–324
See application file for complete search history.

(56) References Cited

U.S. PATENT DOCUMENTS

| 4,525,741 | A | 6/1985 | Chahal et al. |
| 5,047,861 | A | 9/1991 | Houchin et al. |
| 5,379,125 | A | 1/1995 | Iizuka |
| 5,896,172 | A | 4/1999 | Korthout et al. |
| 6,337,713 | B1 | 1/2002 | Sato |

(Continued)

FOREIGN PATENT DOCUMENTS

EP 1 111 904 6/2001

(Continued)

*Primary Examiner*—David L Ometz
*Assistant Examiner*—Richard Bemben
(74) *Attorney, Agent, or Firm*—Frommer Lawrence & Haug LLP; William S. Frommer; Paul A. Levy

(57) ABSTRACT

An image-signal processing apparatus (1) designed to process the signals output from a CCD image sensor (10) that reads pixel data for one screen, line by line, divides the pixel data into a plurality of channels and outputs the pixel data thus divided. The image-signal processing apparatus (1) detects and corrects the black level of each pixel data item that the image sensor (10) has output for one channel. The image-signal processing apparatus (1) detects and corrects the gain difference between channels, which pertain to the pixel data items output from the image sensor (10). Hence, the apparatus (1) can correct the black level of each pixel data item and the gain difference between channels with high accuracy, when used in combination with an image sensor that divides pixel data into a plurality of channels.

13 Claims, 10 Drawing Sheets

U.S. PATENT DOCUMENTS 6,791,615 B1 9/2004 Shiomi et al.
7,295,238 B2 * 11/2007 Tanaka et al. ............... 348/316

FOREIGN PATENT DOCUMENTS

| JP | 1-225291 | 9/1989 |
| JP | 2 200087 | 8/1990 |
| JP | 5 22667 | 1/1993 |
| JP | 6 217206 | 8/1994 |
| JP | 7-38812 | 2/1995 |
| JP | 7-38814 | 2/1995 |
| JP | 8-181921 | 7/1996 |
| JP | 9-46599 | 2/1997 |
| JP | 10-336529 | 12/1998 |
| JP | 2000 244824 | 9/2000 |
| JP | 2001-309242 | 11/2001 |

* cited by examiner

IMAGE-SIGNAL PROCESSING APPARATUS FOR USE IN COMBINATION WITH AN IMAGE SENSOR

This is a continuation of application Ser. No. 10/258,331, filed Mar. 27, 2003 now U.S. Pat. No. 7,295,238 pursuant to 35 USC 371 and based on International Application PCT/JP02/01375, which is entitled to the priority filing date of Japanese application 2001-049272, filed in Japan on Feb. 23, 2001, the entirety of which is incorporated herein by reference.

TECHNICAL FILED

The present invention relates to an image-signal processing apparatus for use in combination with an image sensor that reads pixel data for one screen, line by line, and divides the pixel data thus read, into a plurality of channels and outputs the pixel data thus divided.

BACKGROUND ART

CCD image sensors have hitherto been used in video cameras. The CCD image sensor generates pixel data for one screen, which is acquired as two-dimensional image data. A vertical register and a horizontal register read the pixel data, which is converted into one data stream. The data stream is output from one channel. FIG. 1 shows an CCD image sensor of one-channel output type that transfers data, and also a conventional image-signal processing apparatus of one-channel output type, for use in the CCD image sensor.

As depicted in FIG. 1, the conventional image-signal processing apparatus 101 is designed to process, for example, the image signals output from a CCD image sensor 110. The image sensor comprises a vertical register 111 and a horizontal register 112. The vertical register 111 transfers charges accumulated in an imager in the vertical direction, in units of lines. The horizontal register 112 transfers the charges transferred by the vertical register, in the horizontal direction in units of lines.

The image-signal processing apparatus 101 comprises an analog front-end circuit 121, a delay line 122, a Y/C separating circuit 123, a Y process circuit 124, and a C process circuit 125. The front-end circuit 121 receives a signal output from the horizontal register 112 of the CCD image sensor 110, performs gain control and A/D conversion on the signal and outputs a digital image signal. The delay line 122 delays the digital pixel data by a predetermined time so that the pixel data may be subjected to the Y/C separation that will be carried out later. The Y/C separating circuit 123 receives the pixel data input as a RGB signal or a complementary color, signal and separates the pixel data into a luminance (Y) component and a chroma (C) component. The Y process circuit 124 effects a prescribed process on the luminance (Y) component of the pixel data and outputs luminance data. The C process circuit 125 carries out a specific process on the chroma (C) component of the pixel data and outputs chroma data.

In the image-signal processing apparatus 101 thus configured, the image signal output in one channel from the CCD image sensor 110 is converted to a digital signal and the digital signal is separated into a luminance (Y) component and a chroma (C) component. Therefore, the apparatus 101 can output digital image data that consists of these components. The CCD image sensor 110 may have about 1,000,000 pixels for one screen. In this case, the analog front-end circuit 121 can carry out analog processes, such as A/D conversion, at an operating frequency of about 33 MHz.

In recent years, CCD image sensors having high resolution of more than one million pixels for one screen have come into use. If the image-signal processing apparatus 101 designed to read an one-channel output is to read an image signal from a CCD image sensor of such a high resolution exceeding one million pixels, the process of the analog signal, such as A/D conversion, must be performed at an operating frequency exceeding 40 MHz. At such a high frequency, the analog-signal process such as A/D conversion is inevitably unstable. To make the process stable, it is necessary to use very expensive components such as an IC.

In order to solve this problem, CCD image sensors with a plurality of output channels have been proposed in recent years. Since image signals are supplied from many output channels, these analog signals can be processed (or converted to digital signals) at an operating frequency lower than is required when the CCD image sensor has only one channel. The analog process is performed on the signals of all channels, converting them to digital signals, and the digital signals are combined into one signal for one channel. Thus, the analog process is stable as is desired.

FIG. 2 illustrates a conventional image-signal processing apparatus 201 configured to process image signals output from two channels.

This image-signal processing apparatus 201 processes image signals output from a CCD image sensor 210. The CCD image sensor 210 comprises a vertical register 211 and two horizontal register 212 and 213. The vertical register 211 transfers charges, generated from light and accumulated in an imager in the vertical direction, in units of lines. The horizontal registers 212 and 213 transfer the charges transferred by the vertical register, in the horizontal direction in units of lines. In the CCD image sensor 210, the charges are transferred from the vertical register 211 to the first horizontal register 212 and the charges are transferred from the first horizontal register 212 to the second horizontal register 213. Hence, the sensor 210 outputs image data items for two lines, respectively, at the same time. For example, the first horizontal register 212 outputs the pixels forming an odd-numbered line, while the second horizontal register 213 outputs the pixels forming an even-numbered line.

The image-signal processing apparatus 201 comprises a first analog front-end circuit 221, a second analog front-end circuit 222, a delay line 223, a Y/C separating circuit 224, a Y process circuit 225, and a C process circuit 226. The first front-end circuit 221 receives a signal output from the first horizontal register 212, performs gain control and A/D conversion on the signal and outputs a digital image signal of the first channel. The second front-end circuit 222 receives a signal output from the second horizontal register 213, performs gain control and A/D conversion on the signal and outputs a digital image signal of the second channel. The delay line 223 combines the digital image signals of the first and second channels, into a one-channel image signal. The delay line 223 then delays the one-channel image signal by a predetermined time so that the image signal may be subjected to the Y/C separation to be performed later. The Y/C separating circuit 224 receives the image signal input as a RGB signal or a complementary color signal and separates the image signal into a luminance (Y) component and a chroma (C) component. The Y process circuit 225 carries out a prescribed process on the luminance (Y) component of the image signal and outputs luminance data. The C process circuit 226 effects a specific process on the chroma (C) component of the image signal and outputs chroma data.

In the image-signal processing apparatus 201 thus configured, the image signals output in two channels from the CCD image sensor 210 are converted to a digital signal. The digital signal is separated into a luminance (Y) component and a chroma (C) component. Thus, the apparatus 201 can output a digital image signal that contains a luminance (Y) component and a chroma (C) component. Since the CCD image sensor 210 outputs image signals in two channels, the analog front-end circuits 221 and 222 only need to have a low operating frequency. This renders the analog-signal process stable.

Here arises a problem in manufacturing the CCD images sensor that outputs image signals in two channels. It is very difficult to provide two horizontal registers that are identical in characteristics. Consequently, the signals output in two channels may differ in terms of gain. Further, they may differ in terms of the black-level offset. To adjust the gain difference and the black-level offset difference between channels, the horizontal registers hold a pilot signal each, and the pilot signal corrects the gain and black level of each channel. The pilot signals may have an error, however. Inevitably, it is difficult to adjust the gain difference or the black-level offset difference as is desired.

DISCLOSURE OF THE INVENTION

An object of the present invention is to provide an image-signal processing apparatus that can correct, with high accuracy, the black level output from an image sensor which outputs image data for one screen, in a plurality of channels, and which adjusts the gain difference between channels.

An image-signal processing apparatus according to this invention is designed to process an signal output from an image sensor which reads pixel data for one screen in units of lines and divides the pixel data reread in units of lines, into a plurality of channels, and outputs the pixel data thus divided. The apparatus comprises: black-level correcting means for detecting the black level of the pixel data item for each channel, read from the image sensor, and for correcting the black level of the pixel data item for each channel; and gain correcting means for detecting and correcting the gain difference between the pixel data items for different channels, read by the image sensor.

In the image-signal processing apparatus, the black levels of the pixel data items that the image sensor has output for the respective channels are detected and corrected independently, and the gain difference between channels is detected and corrected.

The image-signal processing apparatus according to the invention is characterized in that the gain correcting means finds an average of the pixel data items for a plurality of lines, detects the gain difference between channels and corrects the gain difference between channels.

The image-signal processing apparatus of the invention is characterized in that the gain correcting means detects the gain difference for each line in the case where the image sensor outputs pixel data items in a plurality of channels for each line. The gain correcting means then corrects the gain difference between channels in accordance with the gain difference thus detected for each line.

BEST MODE FOR CARRYING OUT THE INVENTION

An image-signal processing apparatus that processes an output signal of a CCD image sensor of two-channel output type will be described as an embodiment of the invention, with reference to the accompanying drawings.

Figure 1:
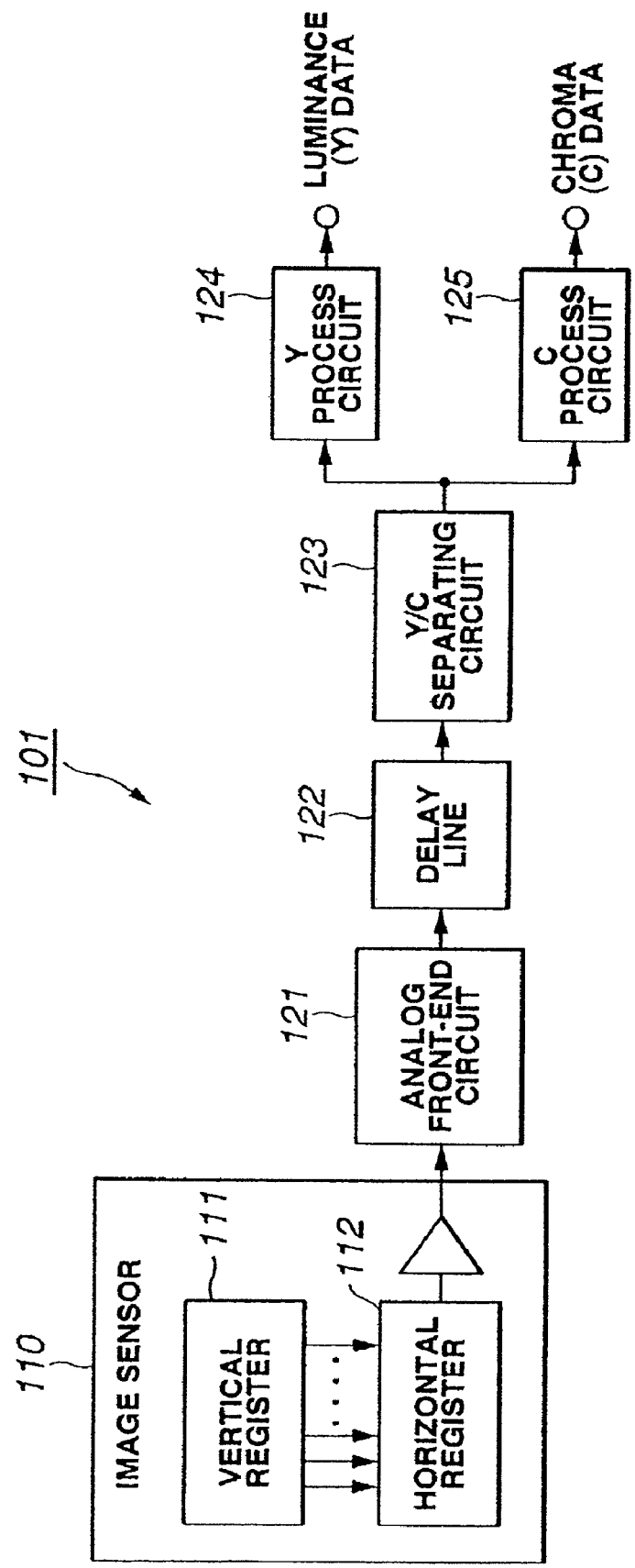
FIG. 1 is a block diagram of a conventional image-signal processing apparatus of one-channel output type, for use in combination with a CCD image sensor that performs two-channel data transfer.
Figure 2:
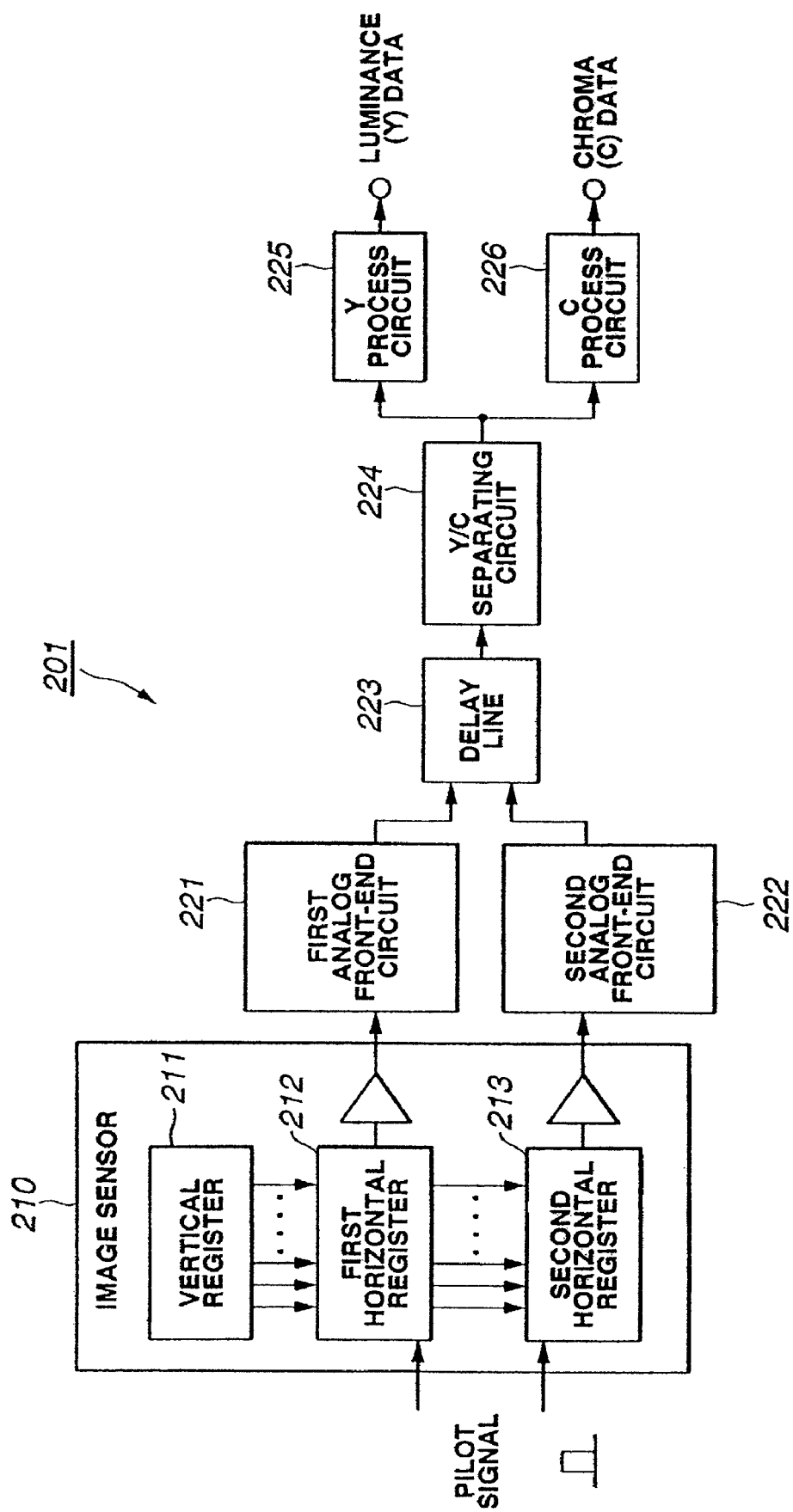
FIG. 2 is a block diagram of a conventional image-signal processing apparatus of one-channel output type, for use in combination with a CCD image sensor that effects two-channel data transfer.
Figure 3:
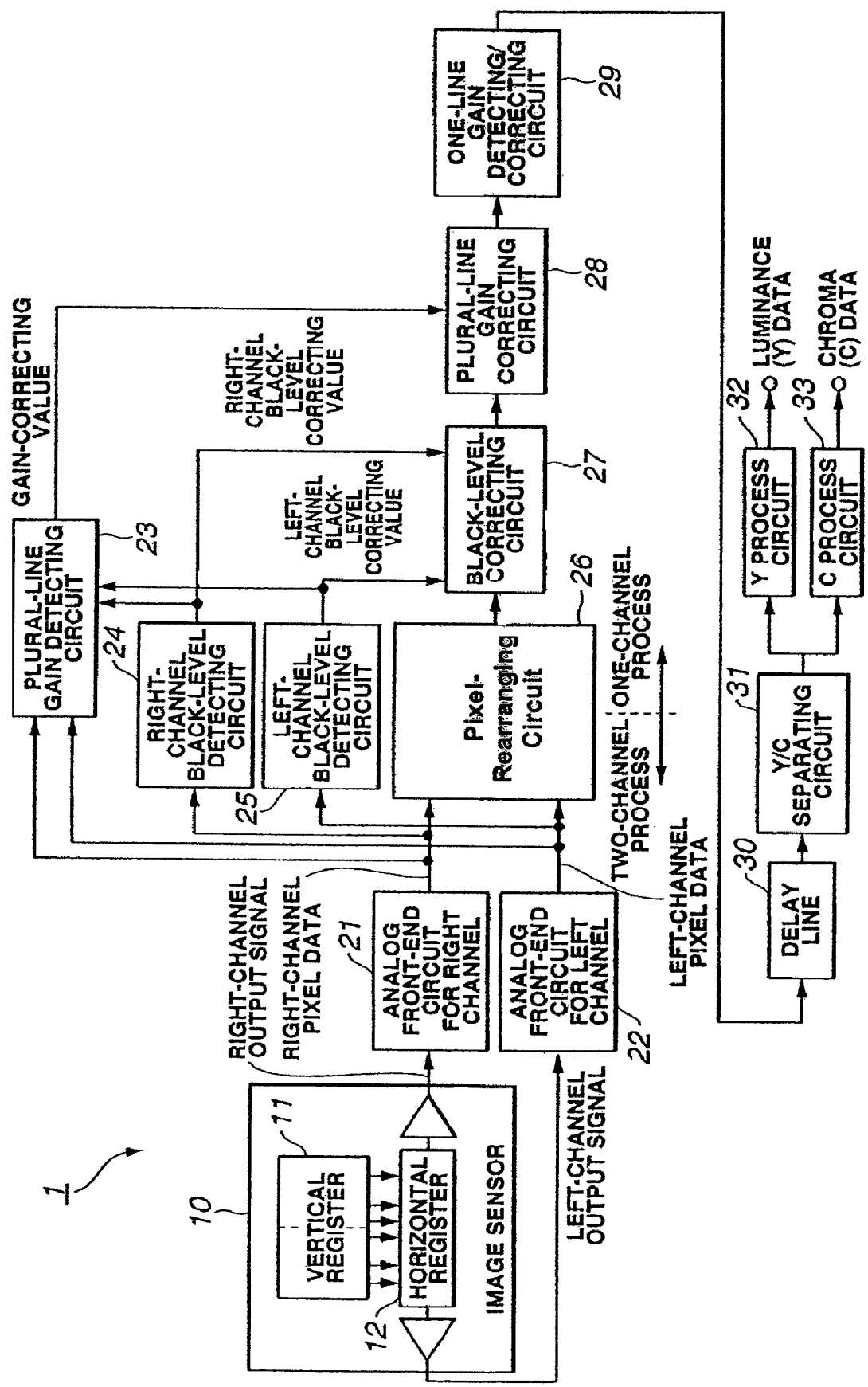
FIG. 3 is a block diagram of an image-signal processing apparatus according to the present invention.

FIG. 3 is a block diagram of an image-signal processing apparatus according to the invention.

The CCD image sensor 10 used in combination with the present embodiment is an image sensor that divides a one-screen image region along a horizontal line, into two parts, and outputs two pixel data items from two channels different from each other. More specifically, the CCD image sensor 10 comprises a vertical register 11 and a one-line horizontal register 12. The vertical register 11 is a register that transfers the charges accumulated in an imager, in units of lines in the vertical direction. The horizontal register 12 receives the one-line charge from the vertical register 11 and transfers this charge in units of pixels in the horizontal direction, thereby to output the pixel data from two channels. The horizontal register 12 divides each line at the midpoint thereof, into two equal parts, and outputs one part from the first channel, and the other part from the second channel. The first and second channels of the horizontal register 12 shall be referred to as "right channel" and "left channel," respectively.

The image-signal processing apparatus 1 comprises a right-channel analog front-end circuit 21, a left-channel analog front-end circuit 22, a plural-line gain detecting circuit 23, a right-channel black-level detecting circuit 24, a left-channel black-level detecting circuit 25, a pixel-rearranging circuit 26, a black-level correcting circuit 27, a plural-line gain correcting circuit 28, a one-line gain detecting/correcting circuit 29, a delay line 30, a Y/C separating circuit 31, a Y process circuit 32, and a C process circuit 33.

The right-channel analog front-end circuit 21 receives an output signal from the right channel of the CCD image sensor 10, performs gain control and A/D conversion on the signal and outputs right-channel pixel data. The right-channel pixel data is supplied from the right-channel analog front-end circuit 21 to the plural-line gain detecting circuit 23, right-channel black-level detecting circuit 24 and pixel-rearranging circuit 26.

The left-channel analog front-end circuit 22 receives an output signal from the left channel of the CCD image sensor 10, performs gain control and A/D conversion on this signal and outputs left-channel pixel data. The left-channel pixel data is supplied from the left-channel analog front-end circuit 22 to the plural-line gain detecting circuit 23, left-channel black-level detecting circuit 25 and pixel-rearranging circuit 26.

The plural-line gain detecting circuit 23 finds the average of the right-channel pixel data for a plurality of lines and the average of the left-channel pixel data for a plurality of lines. The circuit 23 then finds the difference between these averages, thereby obtaining the gain difference between the right and left channels. The gain difference thus obtained is supplied, as a gain-correcting value, to the plural-line gain correcting circuit 28. An example of an operation that the plural-line gain detecting circuit 23 performs will be explained later.

The right-channel black-level detecting circuit 24 detects the black level of the right-channel pixel data. To detect the black level, the difference between any corrected black level and the immediately following black level detected, and the average of such differences accumulated thus far is calculated. The average thus calculated is output as a right-channel black-level correcting value. In other words, a black-level correcting value is obtained by the conversion of data accomplished by, for example, an IIR filter. The left-channel black-level detecting circuit 25 finds a left-channel black-level correcting value in the same way as the right-channel black-level detecting circuit 24 finds the right-channel black-level correcting value. Therefore, the black levels of the right and left channels would not mix. They can be detected with high precision. The black-level correcting values, thus obtained, are supplied to the black-level correcting circuit 27 and the plural-line gain detecting circuit 23.

The pixel-rearranging circuit 26 synthesizes the right-channel pixel data and the left-channel pixel data, converting them to one-channel pixel data. The pixel data output from the pixel-rearranging circuit 26 represents pixels arranged in the same scanning order as the pixels forming a one-screen image data generated by a CCD image sensor of one-channel output type. Thus rearranged, the pixel data items can be processed in the same method as the image-signal processing circuit that is used in the conventional CCD image sensor of one-channel output type. The one-channel pixel data, thus generated, is supplied to the black-level correcting circuit 27. An example of an operation that the pixel-rearranging circuit 26 performs will be described later.

The black-level correcting circuit 27 effects offset addition, adding the black-level correcting values to the one-channel pixel data, thus correcting the black level. Note that the correcting values have been obtained by the black-level detecting circuit 24, independently of each other for the right channel and the left channel, respectively. Hence, the black levels to be added to each pixel of the one-channel pixel data are switched in accordance with the scanning order (for example, every other half line). The image data whose black level is thus corrected is supplied to the plural-line gain correcting circuit 28.

The plural-line gain correcting circuit 28 multiplies a one-channel component (e.g., right-channel component) of the one-channel pixel data by the gain-correcting value the plural-line gain detecting circuit 23 has found. The plural line gain correcting circuit 28 thus corrects the gain difference between channels. The gain difference between the channel can be corrected if the gain for one channel is varied on the basis of the gain for the other channel. This is why the plural-line gain correcting circuit 28 multiplies only the component of one channel component (e.g., right channel) by the gain-correcting value. In order to multiply each pixel of only one channel by the gain-correcting value, it suffices to switching the data component of one channel to the data component of the other channel, and vice versa, in accordance with the scanning order (for example, every other halfline). The pixel data multiplied by the gain-correcting value is supplied to the one-line gain detecting/correcting circuit 29.

The one-line gain detecting/correcting circuit 29 extracts the pixels at the border between the right and left channel, for every line. The circuit 29 then detects the gain difference between the pixels at the border and corrects the gain difference. The one-line gain detecting/correcting circuit 29 can correct the gain of both channels for one line, thereby eliminate the gain discontinuity at the border between the right and left channel for each line. The pixel data, thus gain-corrected for each line, is supplied to the delay line 30. An example of an operation that the circuit 29 performs will be explained later.

The delay line 30 delays the image data by a prescribed time so that Y/C separation may be accomplished later. The pixel data delayed by the delay line 30 is sent to the Y/C separating circuit 31.

The Y/C separating circuit 31 receives the pixel data input as a RGB signal or a complementary color signal. It separates the image signal into a luminance.(Y) component and a chroma (C) component. The luminance (Y) component is supplied to the Y process circuit 32, whereas the chroma (C) component is input to the C process circuit 33.

The Y process circuit 32 carries out a prescribed process on the luminance (Y) component and outputs luminance data. The C process circuit 33 effects a specific process on the chroma (C) component and outputs chroma data.

In the image-signal processing apparatus 1 thus structured, the pixel data output from the CCD image sensor 10 in the left and right channels is converted to digital data for every channel. This can lower the operating frequencies of both analog front-end circuits 21 and 22. The apparatus 1 can, therefore, performs a stable operation.

(Plural-Line Gain Detecting Circuit)

The plural-line gain detecting circuit 23 will be described in detail, in terms of configuration.

Figure 4:
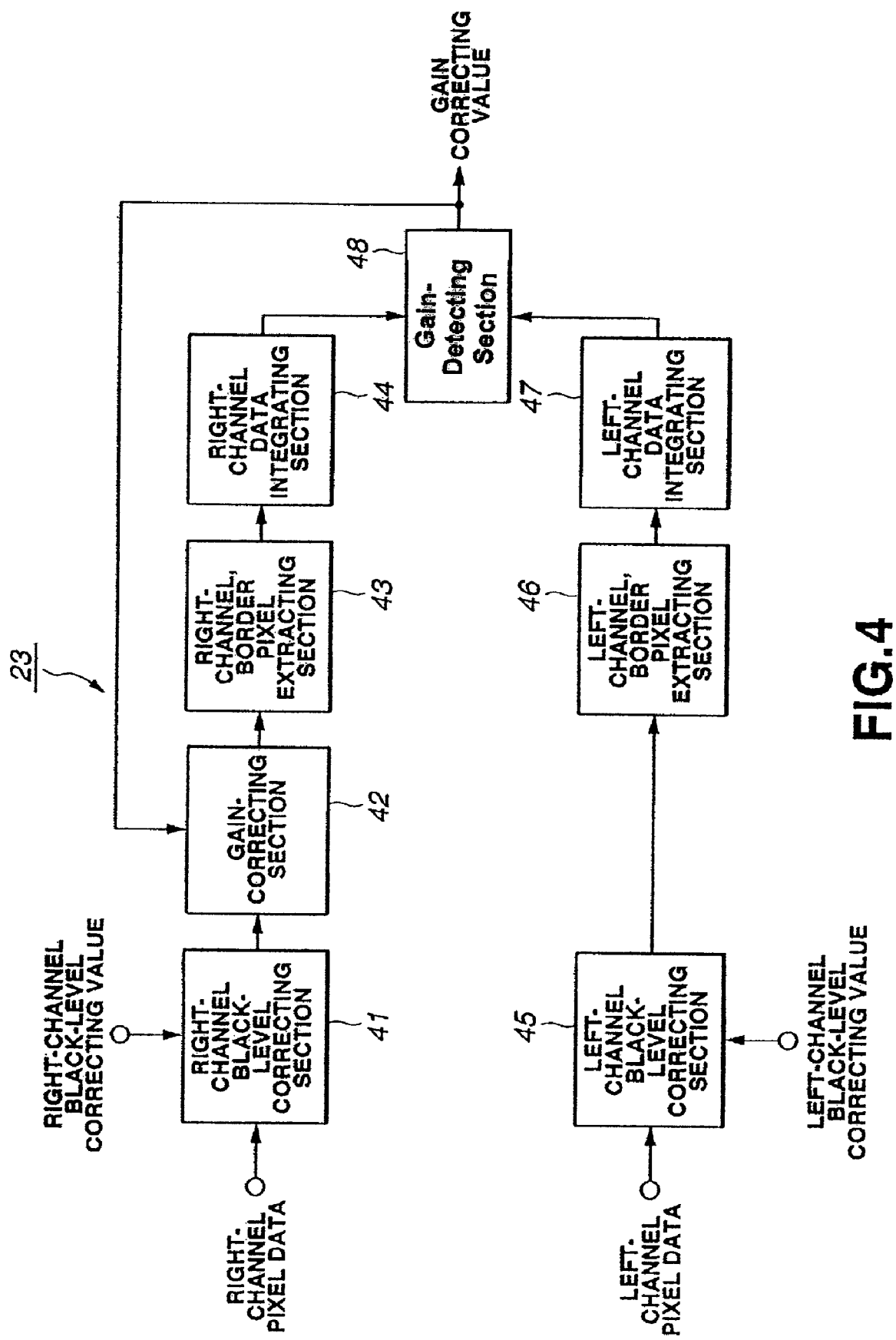
FIG. 4 is a block diagram the plural-line gain detecting circuit incorporated in the image-signal processing apparatus.

As FIG. 4 depicts, the plural-line gain detecting circuit 23 comprises a right-channel black-level correcting section 41, a gain-correcting section 42, a right-channel, border pixel extracting section 43, a right-channel data integrating section 44, a left-channel black-level correcting section 45, a left-channel, border pixel extracting section 46, a left-channel data integrating section 47, and a gain-detecting section 48.

The right-channel black-level correcting section 41 receives the right-channel pixel data and the right-channel black-level correcting value obtained by the right-channel black-level detecting circuit 24. The right-channel black-level correcting section 41 effects offset addition, adding the right-channel black-level correcting value to the right-channel pixel data. The section 41 thereby corrects the right-channel black level. Similarly, the left-channel black-level correcting section 45 receives the left-channel pixel data and the left-channel black-level correcting value obtained by the left-channel black-level detecting circuit 25. The left-channel black-level correcting section 45 effects offset addition, adding the left-channel black-level correcting value to the left-channel pixel data. The section 45 thereby corrects the left-channel black level. Thus, the black level of the pixel data for both channels is corrected before the gain difference between channels is obtained. This makes it possible to detect an accurate gain difference, with the black levels for the channels rendered identical. The pixel data, whose black level has been corrected by the right-channel black-level correcting section 41 is supplied to the gain correcting section 42. Meanwhile, the pixel data, whose black level has been corrected by the left-channel black-level correcting section 45 is supplied to the left-channel, border pixel extracting section 46.

The gain correcting section 42 receives the right-channel pixel data whose black level has been corrected, and also the gain-correcting value that has been obtained by the gain-detecting section 48. The gain-correcting section 42 multiplies the right-channel pixel data by the gain-correcting value, thereby correcting the gain of the right-channel pixel data. The gain is detected after it is thus corrected. Therefore, either the increment or decrement of the gain-correcting value thus far found can be output as correcting data, not detecting the gain from the initial value. Hence, the integrating sections 44 and 47 and the gain detecting section 48 at the subsequent stages can be simplified in both circuit configuration and operation scheme. The right-channel pixel data, whose gain has been corrected by the gain correcting section 42, is supplied to the right-channel, border pixel extracting section 43.

Figure 5:
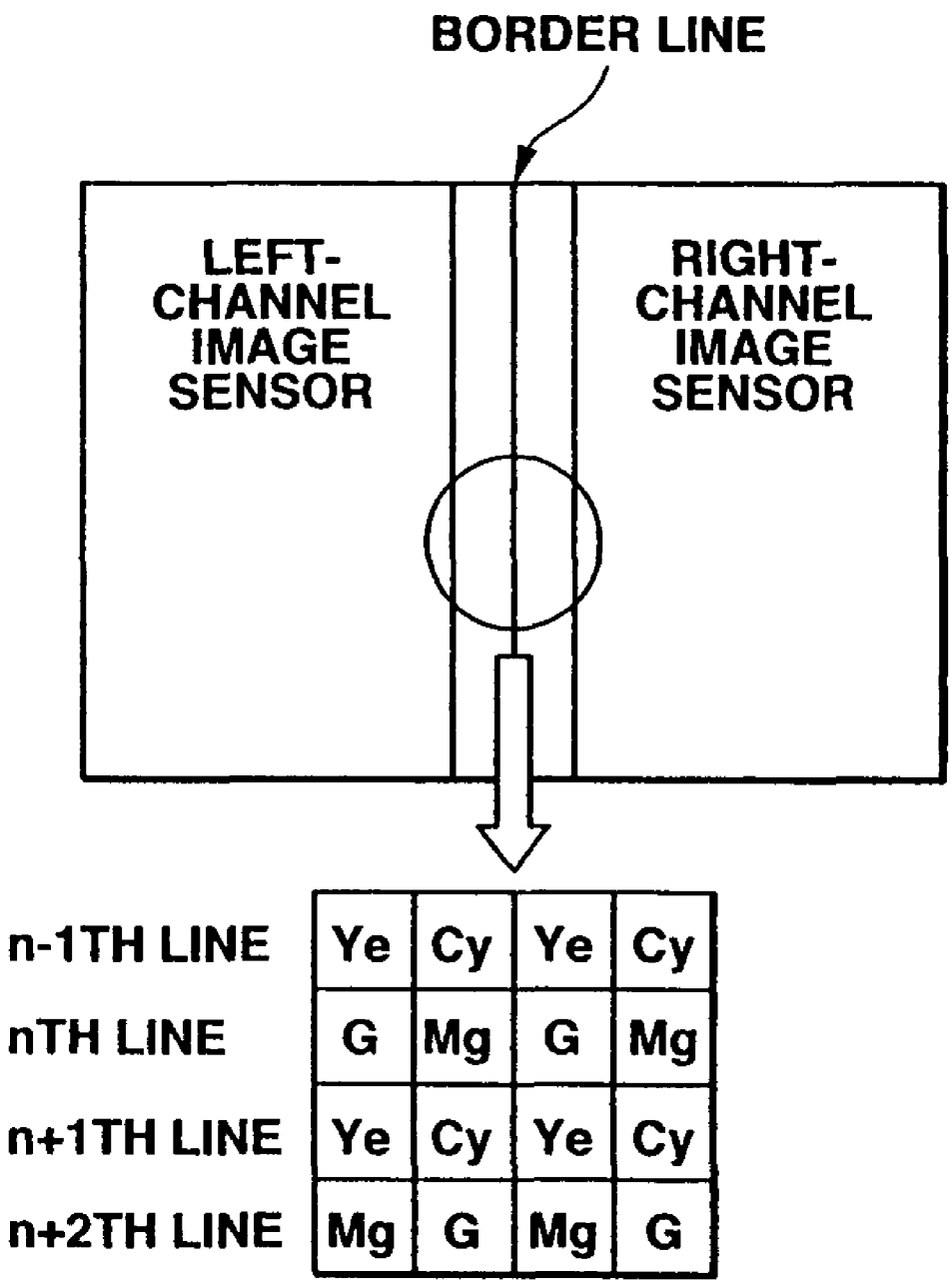
FIG. 5 is a diagram explaining the operation of the border pixel extracting section provided in the plural-line gain detecting circuit.

The right-channel, border pixel extracting section 43 and the left-channel, border pixel extracting section 46 extract only pixels at the border between the right and left channels. These pixels are extracted so that the difference between the right-channel image and the left-channel image may not influence the accuracy of the gain difference between channels, which is to be detected. This is because the pixels at the border are intensely correlated, or have but an extremely small difference, in terms of image characteristic. The right-channel, border pixel extracting section 43 and the left-channel, border pixel extracting section 46 extract, for example, two columns of pixels each. As FIG. 5 shows, the section 43 extracts the two columns of pixels, on the right of the border line, and the section 46 extracts the two columns of pixels, on the left of the border line. The border pixel data of the right channel is supplied to the right-channel data integrating section 44, whereas the border pixel data of the left channel is supplied to the left-channel data integrating section 47.

The right-channel data integrating section 43 and the left-channel data integrating section 46 integrate the border pixel data thus extracted, for all lines in the vertical direction. The integration they perform is given by the following equation (1):

$$S_m = (1/2^n) I_m + ((2^n - 1)/2^n) S_{m-1} \quad (1)$$

where I is the value of a pixel of the border pixel data input, S is the result of integration, and n is the time constant of integration. The subscript to I and S is the serial number of the border pixel data item.

Figure 6:
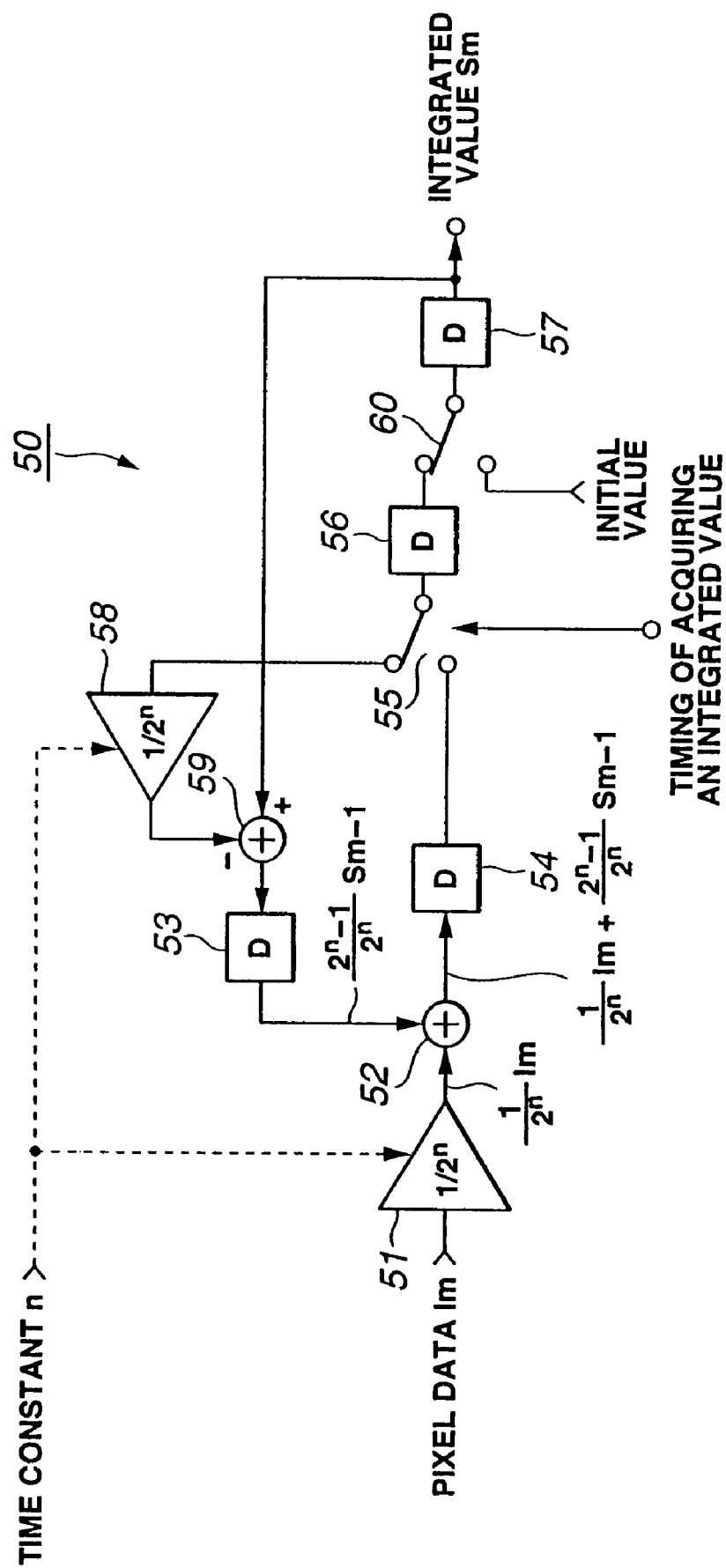
FIG. 6 is a circuit diagram showing the border-pixel integrating section provided in the plural-line gain detecting circuit.

The equation is solved by hardware, more precisely an operation circuit 50 illustrated in FIG. 6.

In the operation circuit 50, the border pixel data $I_m$ is input to the first multiplier 51. The first multiplier 51 multiplies the border pixel data $I_m$ by $1/2^n$ and outputs the product "$(1/2^n)I_m$". The output of the first multiplier 51 is input to the first adder 52. The first adder 52 adds the value "$(1/2^n)I_m$" output from the first multiplier 51 and the value "$((2^n-1)/2^n)S_{m-1}$" stored in the first latch circuit 53, thereby obtaining an integrated value $S_m$. The integrated value $S_m$ thus obtained is stored into the second latch circuit 54. The integrated value $S_m$ stored in the second latch circuit 54 is transferred to the third latch circuit 56 via the first switch 55 that is switched in accordance with the timing of acquiring the integrated value. The integrated value $S_m$ stored in the third latch circuit 56 is transferred to the fourth latch circuit 57. The value $S_m$ stored in the fourth latch circuit 57 is output from the operation circuit 50. The integrated value $S_m$ stored in the fourth latch circuit 57 is processed by the second multiplier 58 and the second adder 59, which cooperate to calculate the value "$((2^n-1)/2^n)S_m$". This value is stored into the first latch circuit 53 and will be used as value "$((2^n-1)/2^n)S_{m-1}$" when the next border pixel data $I_m$ is input.

Figure 7:
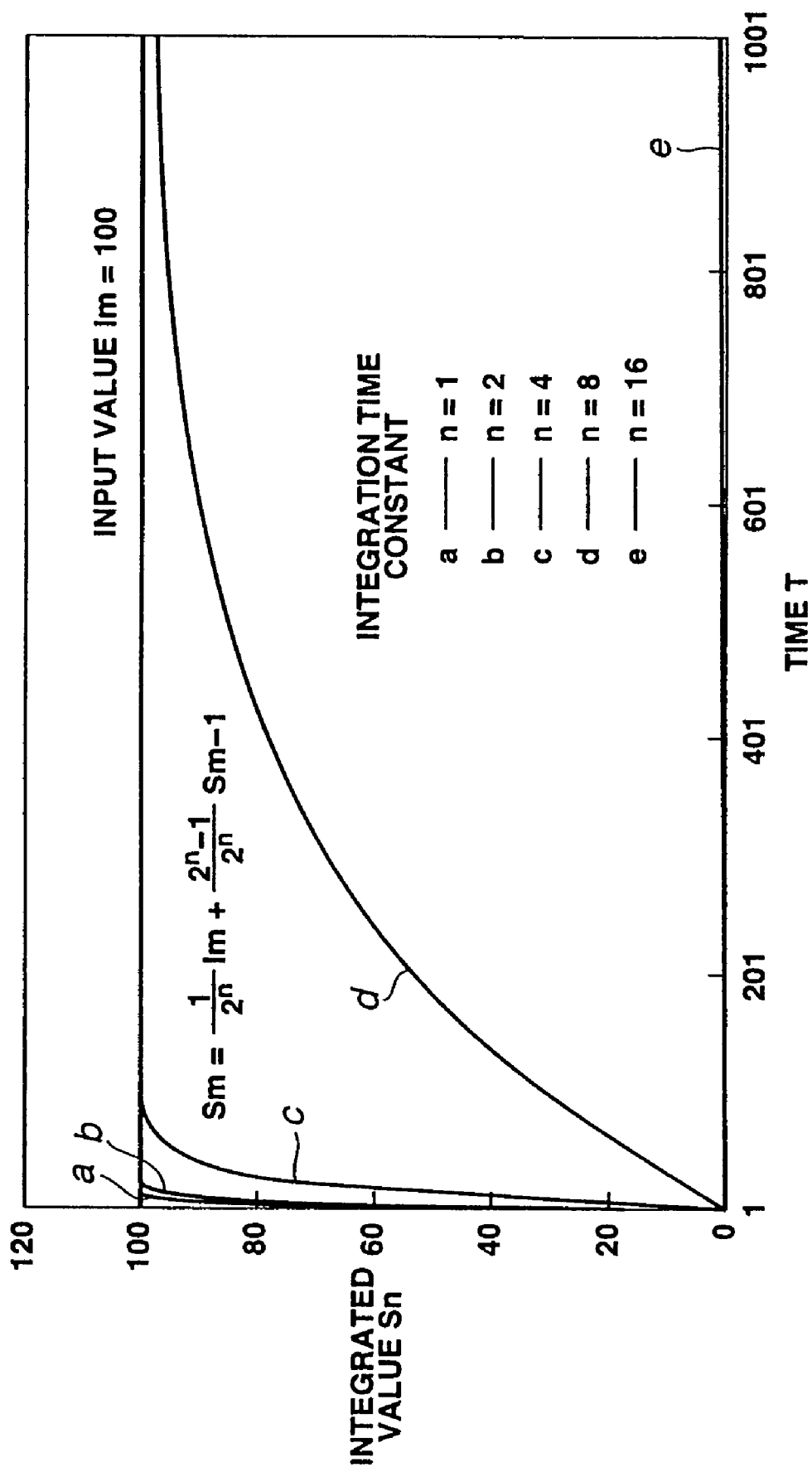
FIG. 7 is a diagram for explaining the speed with which the integrated value converges when the time constant n is changed in the border-pixel integrating section.

In the operation circuit 50, a time constant n input from an external device sets the multipliers $1/2^n$ of the multipliers 51 and 52. The time constant n is, for example, a programmable one. Therefore, the speed at which the integrated value S converges can be changed. FIG. 7 is a graph showing how this speed changes when I=100.

The integration circuit 50 has a switch 60 for setting an initial integrated value. Once the initial integrated value is set, the time the integrated value requires to become stable can be shortened.

The right-channel data integrating section 43 and the left-channel data integrating section 46 output the right-channel integrated value and the left-channel integrated value, respectively, as has been described above. The right-channel integrated value and the left-channel integrated value are supplied to gain-detecting section 48.

The gain detecting section 48 compares the right-channel integrated value with the left-channel integrated value. The section 48 increases or decreases the gain-correcting value in units of counts, in accordance with which integrated value is greater than the other.

Figure 8:
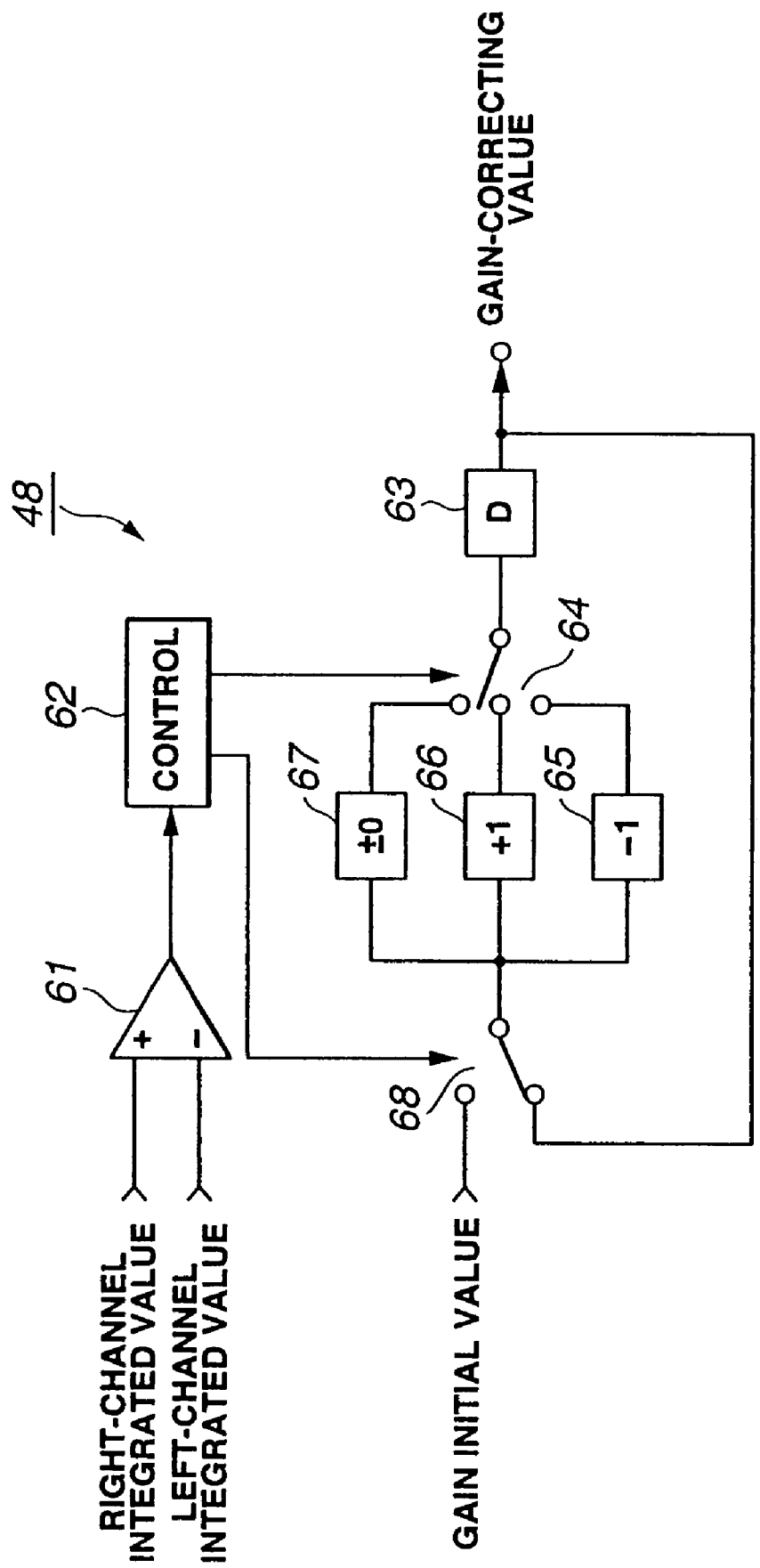
FIG. 8 is a diagram illustrating the circuit configuration of the gain detecting section incorporated in the plural-line gain detecting circuit.

The gain detecting section 48 can be configured as is shown in FIG. 8. In the gain detecting section 48 of FIG. 8, the comparator 61 compares the right-channel integrated value with the left-channel integrated value. The result of the comparison is given to the control circuit 62. The control circuit 62 changes over the switch 64 at every gain-acquiring timing. The gain-correcting value stored in the output latch circuit 63 is thereby fed back to the −1 adder 65, +1 adder 66 and the ±0 adder 67. The gain-correcting value is therefore increased or decreased in units of ±1. This sequence of operations is carried out in the gain-detecting section 48 to detect the gain, always in accordance with the output signal of the CCD image sensor 10. In the gain detecting section 48, the switch 68 is changed over at the time of starting the gain detection. The section 48 can therefore output a preset initial value as the gain-correcting value. This helps to reduce the time that the gain-correcting value needs to converge to a stable value.

As indicated above, the plural-line gain detecting circuit 23 finds the average of the right-channel pixel data for a plurality of lines and the average of the left-channel pixel data for a plurality of lines. The circuit 23 then finds the difference between these averages, obtaining the gain difference between the right and left channels. In one embodiment the number of lines for which pixel data is averaged may be changed programmably.

(Pixel-Rearranging Circuit)

The pixel-rearranging circuit 26 will be described in detail.

The pixel-rearranging circuit 26 synthesizes pixel data trains for two channels, i.e., the right-channel pixel data and the left-channel pixel data, and generates one-channel pixel data train.

Figures 9A, 9B:
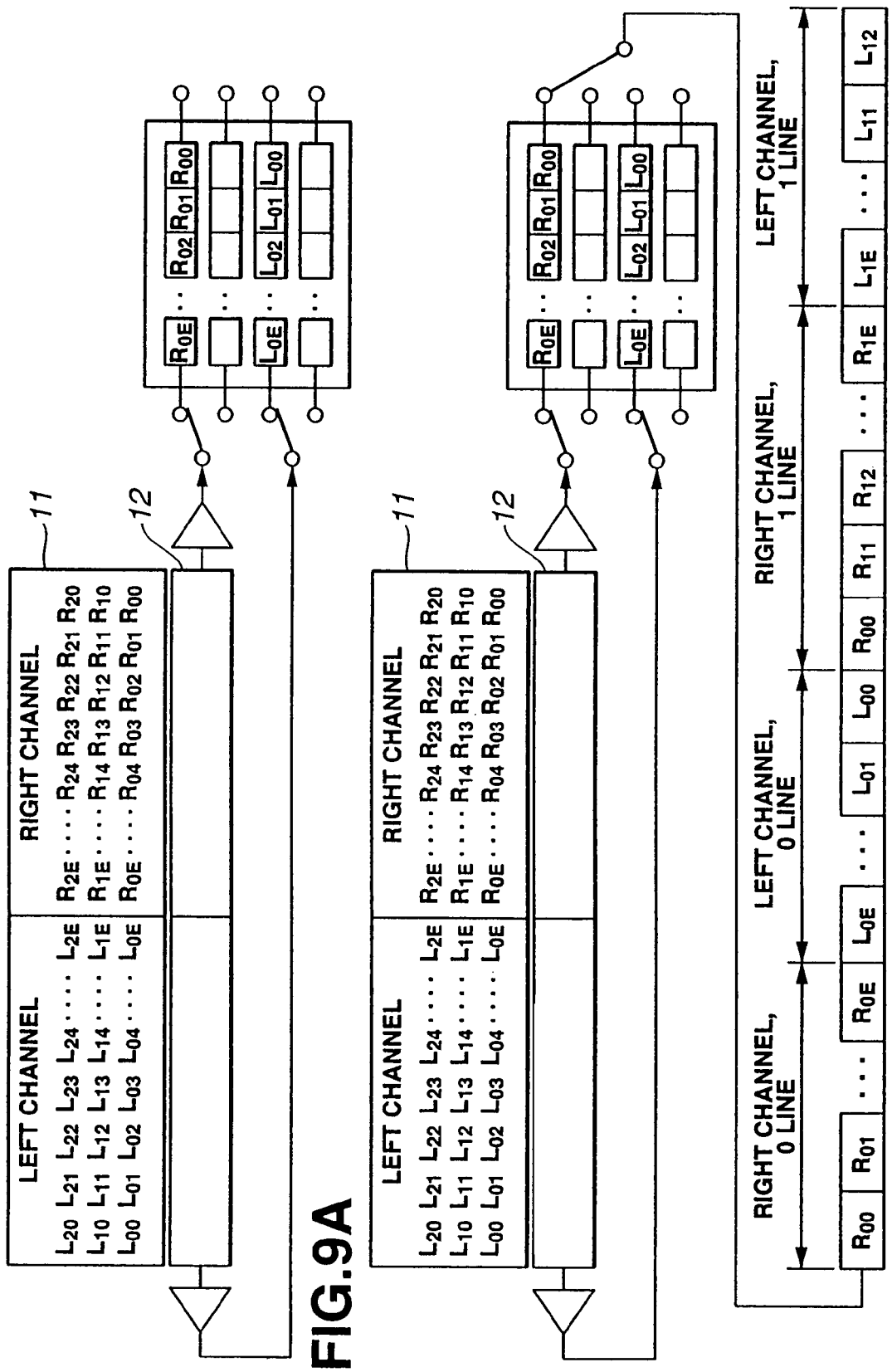
FIG. 9 is a diagram for explaining the process preformed by the pixel-rearranging circuit provided in the image-signal processing apparatus.

For example, the pixel-rearranging circuit 26 uses a memory that has two input ports and one output port as shown in FIGS. 9A and 9B. Using the memory, the circuit 26 rearranges the pixels, thus converting the two-channel pixel data to one-channel pixel data train.

As FIG. 9A shows, the circuit 26 writes the right-channel pixel data and the left-channel pixel data, line by line, into the memory through two independent input ports.

As FIG. 9B depicts, the circuit 26 first reads the pixel data items for the 0th line of the right channel, in the same order they have been written into the memory. Then, it reads the pixel data items of the pixel data for the 0th line of the left channel, in the order reverse to the order they have been written into the memory. Next, it reads the pixel data items for the 1st line of the right channel, in the same order they have been written into the memory. Further, it reads the pixel data items for the 1st line of the left channel, in the order reverse to the order they have been written into the memory. In this way, the circuit 26 reads the right-channel read addresses and the left-channel read addresses alternately, in units of half lines. Thus, the circuit 26 provides pixel data items arranged in the order a CCD image sensor of one-channel output type scans the image on the screen. The data must be read at a rate that is at least twice the write rate.

(One-Line Gain Detecting/Correcting Circuit)

The one-line gain detecting/correcting circuit 29 will be described.

The one-line gain detecting/correcting circuit 29 is a circuit that extracts the pixels at the border between the right and left channels, for every line, then detects the gain difference between the right-channel pixel data near the border and the left-channel pixel data near the border, and finally corrects the gain difference.

Figure 10:
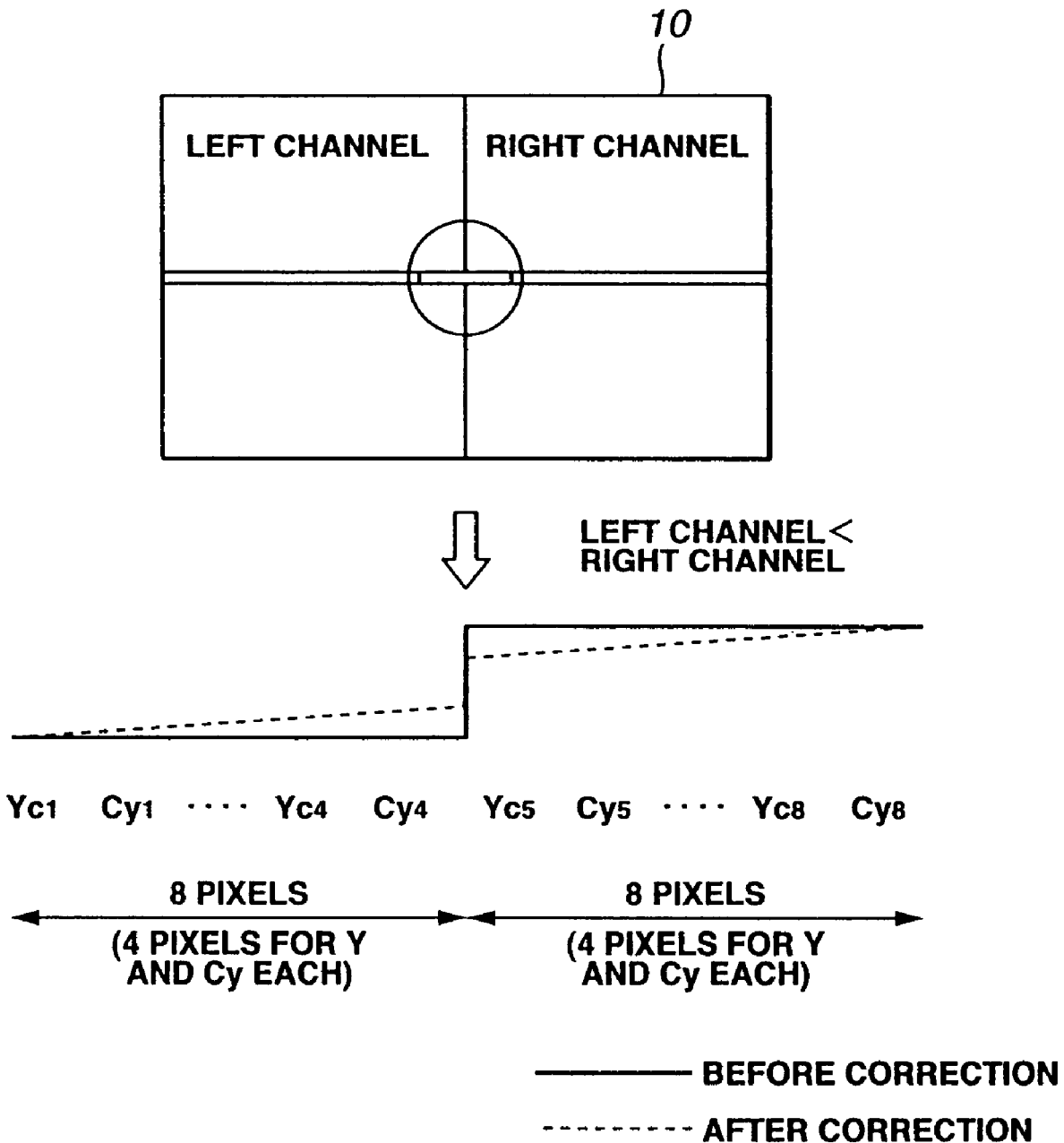
FIG. 10 is a diagram for explaining the process carried out by the one-line gain detecting/correcting circuit provided in the image-signal processing apparatus.

The one-line gain detecting/correcting circuit 29 extracts pixels near the border between the channels, for every line, as is illustrated in FIG. 10. In this case, the circuit 29 extracts in units of eight pixels, for the right channel and the left channel. The circuit 29 finds the average of the pixel values for the right channel and the average of the pixel values for the left channel. In accordance with the ratio between these averages, the circuit 29 lowers the level of pixels if the channel has a large gain, and raises the level of pixels if the channel has a small gain. Thus, the circuit 29 reduces the gain difference at the border between channels. For instance, the pixels near the border may be more corrected than the pixels far from the border, thereby minimizing the inter-channel level difference observed at the border between channels.

The gain difference between channels is thus corrected for each line. The gain discontinuity at the border between the right and left channels, occurring for each line, can be eliminated.

In the image-signal processing apparatus 1 according to the present embodiment, the black level of the pixel data of one channel, output from the CCD image sensor 10 that outputs pixel data in two channels, is detected and corrected independently of the black level of the pixel data of the other channel. Further, the gain difference between the channels is detected and corrected. The image-signal processing apparatus 1 can therefore correct, with high precision, the black levels of the right-channel and left-channel pixel data items and the gain difference between channels.

In the image-signal processing apparatus 1, the inter-channel gain differences for a plurality of lines are detected and averaged, thereby correcting the gain difference between channels. The image-signal processing apparatus 1 can therefore correct the gain difference with high accuracy.

In the image-signal processing apparatus 1, the border between the right and left channel and the pixels near the border are extracted, thereby detecting the gain difference between channels from the pixels thus extracted and correcting the gain difference between channels. The pure gain-difference component that contains no image components can therefore be detected in the image-signal processing apparatus 1. Hence, the gain difference between channels can be corrected with higher precision.

INDUSTRIAL APPLICABILITY

In the image-signal processing apparatus according to the present invention, the black levels of the pixel data items output from an image sensor for a plurality of channels are detected and corrected independently of one another, and the gain difference between channels is detected and corrected.

Therefore, the image-signal processing apparatus of this invention can correct not only the black levels of the channels of the image sensor, but also the gain difference between channels, with high accuracy.

Further, in the image-signal processing apparatus according to the invention, the average of the pixel data items for a plurality of lines is obtained, the gain difference between channels is detected and corrected.

The image-signal processing apparatus of this invention can therefore correct the gain difference with a higher accuracy.

Moreover, in the image-signal processing apparatus of the invention, the border between any two adjacent channels is detected and the data items representing pixels near the border is extracted when the image sensor outputs pixel data items in a plurality of channels for each line. The gain difference between channels is detected from the pixel data items extracted and then is corrected. Hence, the image-signal processing apparatus can detect a pure gain-difference component that contains no image components. This makes it possible to correct the gain difference between channels with higher precision.

The invention claimed is:

1. An image-signal processing apparatus for processing the signals output from an image sensor that reads pixel data for one screen, line by line, divides the pixel data into a plurality of channels and outputs the pixel data thus divided, said apparatus comprising:
    black-level correcting means for detecting the black level of the pixel data item for each channel, read from the image sensor, and for correcting the black level of the pixel data item for each channel;
    gain correcting means for detecting and correcting the gain difference between the pixel data items between any two adjacent channels selected from the plurality of channels, read by the image sensor;
    plural-line gain correcting means for multiplying one of the two adjacent channels by a gain-correcting value to create a gain-corrected channel;
    one-line gain detecting/correcting means for receiving an output from the plural-line gain correcting means and extracting pixels at a border between the gain-corrected channel and the remaining adjacent channel then detecting and correcting the gain difference between the pixels at the border between the gain-corrected channel and the remaining adjacent channel on every line; and
    output means for outputting the gain-corrected pixels for each line.

2. The image-signal processing apparatus according to claim 1, wherein the gain correcting means finds an average of the pixel data items for a plurality of lines, detects the gain difference between channels and corrects the gain difference between channels.

3. The image-signal processing apparatus according to claim 2, wherein the gain correcting means programmably changes the number of lines for which pixel image data items are averaged.

4. The image-signal processing apparatus according to claim 1, wherein the gain correcting means corrects the gain difference between channels for the pixel data corrected in terms of black level.

5. The image-signal processing apparatus according to claim 1, wherein the black-level correcting means applies an offset to the pixel data items read from the image sensor, thereby to correct the black level of each pixel data item.

6. The image-signal processing apparatus according to claim 5, wherein the black-level correcting means detects the black level of the pixel data item for each channel, read from the image sensor, and calculates a target black level from the difference between the preset black level corrected and the black level detected.

7. The image-signal processing apparatus according to claim 1, further comprising pixel rearranging means for storing into a memory the pixel data items output for each channel, reading the pixel data items from the memory in a prescribed order and in units of screens, and outputting one-channel pixel data.

8. The image-signal processing apparatus according to claim 7, wherein the black-level correcting means and the gain correcting means correct the black level and the gain difference, respectively, which pertain to the one-channel pixel data output from the pixel rearranging means.

9. The image-signal processing apparatus according to claim 8, wherein the black-level correcting means and the gain correcting means detect the black level and the gain difference, respectively, from the pixel data which has yet to be converted to one-channel pixel data by the pixel rearranging means, and correct the black level and the gain difference, respectively, which pertain to the one-channel pixel data generated by the pixel rearranging means.

10. The image-signal processing apparatus according to claim 1, wherein the image sensor outputs image pixel data items in a plurality of channels for each line, the gain correcting means detects the gain difference between channels for each line and corrects the gain difference between channels in accordance with the gain difference detected.

11. The image-signal processing apparatus according to claim 10, wherein the gain correcting means detects the average of gain differences between channels, for a plurality of lines, corrects the gain difference between channels, detects the gain difference between channels, for each line, and corrects the gain difference between channels, for each line, in accordance with the gain difference detected.

12. The image-signal processing apparatus according to claim 1, wherein the image sensor outputs pixel data items in a plurality of channels for each line and the gain correcting means detects the border between any two adjacent channels, extracts the data items representing pixels near the border, detects the gain difference between channels from the pixel data items extracted and corrects the gain difference between channels.

13. An image-signal processing method for processing signals output from an image sensor that reads pixel data for one screen, line by line, divides the pixel data into a plurality of channels and outputs the pixel data thus divided, the method comprising:

detecting and correcting the black level of the pixel data item for each channel;

detecting and correcting the gain difference between the pixel data items between any two adjacent channels selected from the plurality of channels;

multiplying one of the two adjacent channels by a gain-correcting value to create a gain-corrected channel;

extracting pixels at a border between the gain-corrected channel and the remaining adjacent channel then detecting and correcting the gain difference between the pixels at the border between the gain-corrected channel and the remaining adjacent channel on every line; and outputting means for outputting the gain-corrected pixels for each line.

* * * * *